(12) United States Patent
Hong et al.

(10) Patent No.: US 6,854,648 B2
(45) Date of Patent: Feb. 15, 2005

(54) INFORMATION STORAGE APPARATUS USING SEMICONDUCTOR PROBE

(75) Inventors: Seung-bum Hong, Kyungki-do (KR); Jong Up Jeon, Kyungki-do (KR); Hyun-jung Shin, Kyungki-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 43 days.

(21) Appl. No.: 10/232,621

(22) Filed: Sep. 3, 2002

(65) Prior Publication Data

US 2003/0098347 A1 May 29, 2003

(30) Foreign Application Priority Data

Nov. 23, 2001 (KR) ........................................ 2001-73290

(51) Int. Cl.⁷ ................................................ G06K 7/08
(52) U.S. Cl. ........................ 235/451; 235/492; 257/295
(58) Field of Search ............................... 235/451, 492; 257/295, 421–427

(56) References Cited

U.S. PATENT DOCUMENTS 5,985,404 A * 11/1999 Yano et al. ................. 428/65.3
6,477,132 B1 * 11/2002 Azuma et al. .............. 369/126

FOREIGN PATENT DOCUMENTS

JP    A-6-243518    9/1994
KR   A-10-2001-19871    3/2001

* cited by examiner

Primary Examiner—Michael G. Lee
Assistant Examiner—Kimberly D. Nguyen
(74) Attorney, Agent, or Firm—Burns, Doane, Swecker & Mathis, L.L.P.

(57) ABSTRACT

An information storage apparatus includes a recording medium and a head. The recording medium has an electrode layer, a ferroelectric film that is stacked on the electrode layer, and a semiconductor layer that is stacked on the ferroelectric film. The head has a semiconductor probe for forming a dielectric polarization on the ferroelectric film to record information and reproducing information from the dielectric polarizations on the ferroelectric film by making a p-n junction with the recording medium. Thus, it is possible to manufacture a small-sized information storage apparatus which is capable of repeatedly recording and reproducing information at a high speed.

17 Claims, 7 Drawing Sheets

INFORMATION STORAGE APPARATUS USING SEMICONDUCTOR PROBE

Priority is claimed to Patent Application Number 2001-73290 filed in Republic of Korea on Nov. 23, 2001, herein incorporated by reference.

BACKGROUND OF THE INVENTION

1. Field of the Invention

The present invention relates to an information storage apparatus for recording information on a recording medium and reproducing information from the recording medium using a scanning probe, and more particularly, to an information storage apparatus of a recording medium having a ferroelectric film.

2. Description of the Related Art

As the demand for small-sized products such as portable communication terminals and electronic notes increases nowadays, highly integrated micro nonvolatile recording media are increasingly required. It is uneasy to small-size existing hard disks and to highly integrate flash memories. Thus, recording media using a scanning probe have been studied as an alternative plan. Here, the scanning probe represents a probe used in a scanning tunneling microscope (STM), an atomic force microscope (AFM), or a scanning probe microscope (SPM).

The recording media includes recording media which are formed of a ferroelectric substance, a ferromagnetic body, a thermoplastic resin or thermosetting resin. A method of recording information on the recording media includes a method of using electromagnetic force that reverses a domain of a ferroelectric substance or ferromagnetic body of a recording medium with a scanning probe and a method of inducing phase shift by applying heat to a recording medium or physically forming a mark on the recording medium to recode information.

Also, a method of reproducing information recorded on the recording media includes a method of sensing electrostatic force, electrostatic magnetic force, piezoelectric force, and the like operating at a probe and a method of sensing variations in characteristics of a recording medium such as the difference in an electric conductivity or a heat conductivity.

Figures 1A, 1B:
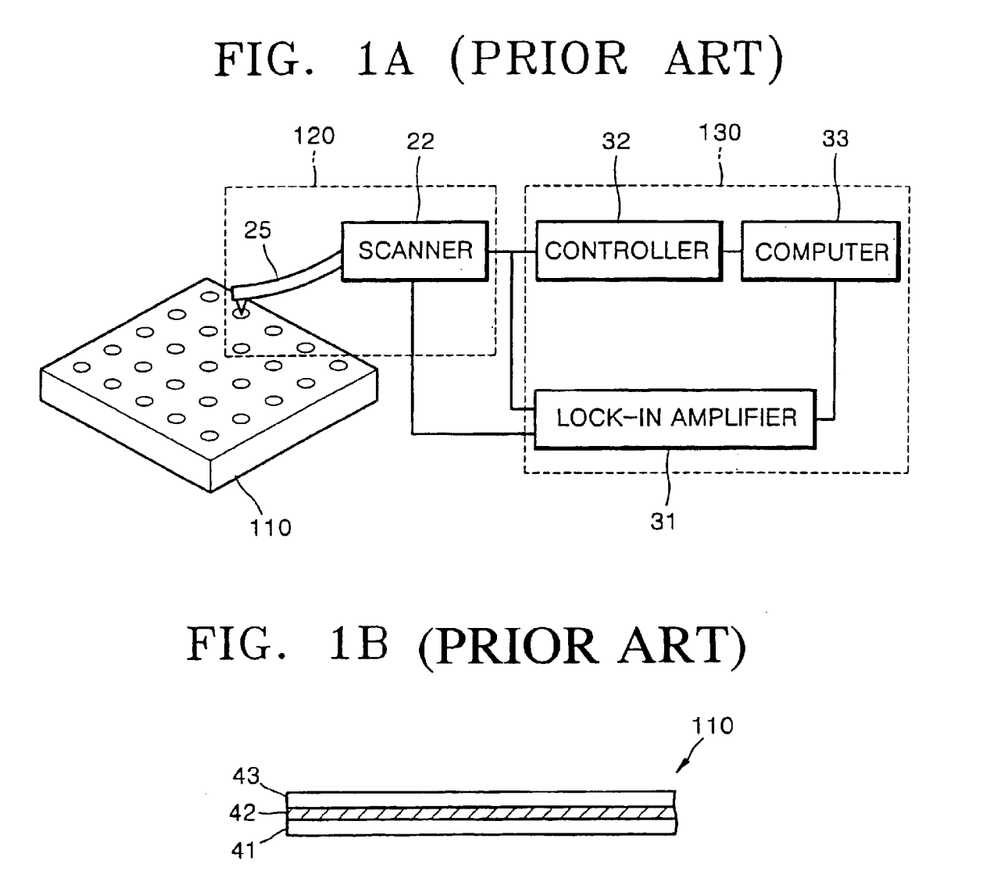
FIG. 1A is a schematic view of the configuration of a conventional information storage apparatus.
FIG. 1B is cross-sectional view of a recording medium of the conventional information storage apparatus shown in FIG. 1A.

For example, FIG. 1 is a view of an ultradensity information storage apparatus using a ferroelectric thin film disclosed in Korea Patent Publication No. 2001-19871. Referring to FIG. 1A, the ultradensity information storage apparatus includes a recording medium 110, a head 120, and a control unit 130. The recording medium 110 stores information. The head 120 reads information recorded on the recording medium 110. The control unit 130 analyzes polarity of a dielectric polarization using an electric signal and controls the head 120 which is related to the polarity of the dielectric polarization. The head 120 includes a probe unit 25 and a scanner 22, and the control unit 130 includes a controller 32, a computer 33, and a lock-in amplifier 31.

Figure 1C:
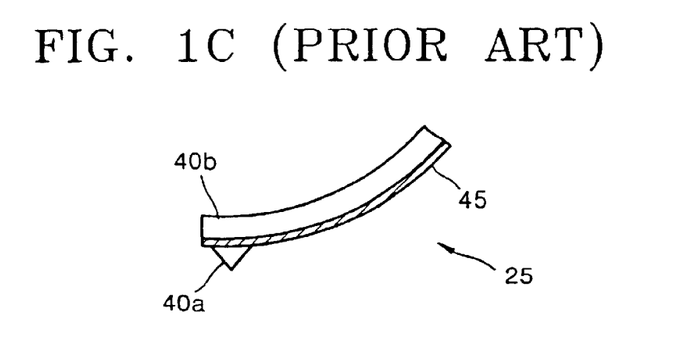
FIG. 1C is a cross-sectional view of a probe unit of the conventional information storage apparatus shown in FIG. 1A.

Referring to FIG. 1B, the recording medium 110 includes a substrate 41, an electrode layer 42 that is stacked on the substrate 41, and a ferroelectric film 43 that is stacked on the electrode layer 42. Referring to FIG. 1C, the probe unit 25 includes a probe 40a, a cantilever 40b for supporting the probe 40a, and a piezoelectric substance 45 between the probe 40a and the cantilever 40b.

The ultradensity information storage apparatus applies an alternating current (AC) having a predetermined frequency to the probe 40a in a state that the ferroelectric film 43 contacts the probe 40a, amplifies variations in amplitude of the ferroelectric film 43 based on the AC due to electric force between dielectric polarizations using the lock-in amplifier 31, analyzes the variations, and detects information on the dielectric polarizations.

A method of reproducing information in a state that a probe contacts a recording medium has a problem of wearing the probe and the recording medium.

A method of sensing force to reproduce information has a disadvantage in that resonance frequency (generally, 1 MHz or less) of a cantilever limits a speed for reproducing information. In particular, since a method of sensing a polarized state of a domain of a ferroelectric thin film using piezoelectric force has to use a lock-in amplifier for amplifying a signal sensed from a recoding medium, it is difficult to further reduce the size of an ultradensity information storage apparatus.

It is difficult to further reduce the size of an information storage apparatus since the method of reproducing information in a state that the probe contacts the recording medium needs a feedback circuit for every probe to maintain the uniform distance between the probe and the recording medium.

SUMMARY OF THE INVENTION

To solve the above-described problems, it is an object of the present invention to provide a small-sized information storage apparatus which is capable of recording information on a recording medium having a ferroelectric medium at a high speed or reproducing information from the recording medium.

Accordingly, to achieve the above object, there is provided an information storage apparatus using a semiconductor probe including a recording medium and a head. The recording medium has an electrode layer, a ferroelectric film that is stacked on the electrode layer, and a semiconductor layer that is stacked on the ferroelectric film. The head has a semiconductor probe for forming a dielectric polarization on the ferroelectric film to record information and reproducing information from the dielectric polarizations on the ferroelectric film by making a p-n junction with the recording medium.

Here, the semiconductor probe is an n-type semiconductor if the semiconductor layer of the recording medium is a p-type semiconductor. The semiconductor probe is a p-type semiconductor if the semiconductor layer of the recording medium is an n-type semiconductor.

The semiconductor probe records information in a state the semiconductor probe contact or does not contact the recording medium.

The semiconductor probe reproduces information in a state that the semiconductor probe contacts the recording medium.

It is preferable that contact resistance between the semiconductor layer and the semiconductor probe varies based on polarity of the ferroelectric film.

It is preferable that the head further includes a cantilever for supporting the semiconductor probe.

It is preferable that the ferroelectric film has a dielectric polarization of 10 $\mu C/cm^2$ or more.

The information storage apparatus records and reproduces using a dielectric polarization. In particular, a p-n junction is formed using a recording medium having a semiconductor and a semiconductor probe to record and reproduce information at a high speed. Thus, it is possible to small-size the information storage apparatus. Further, since resistance of the p-n junction is measured to determine a dielectric polarization, an additional lock-in amplifier is unnecessary. Thus, it is easy to constitute a control unit. Highly integrated nonvolatile information can be stored using the dielectric polarization.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Hereinafter, an embodiment of an information storage apparatus using a semiconductor probe according to the present invention will be described with reference to the attached drawings. Like reference numerals in the drawings denote the same members.

Figure 2:
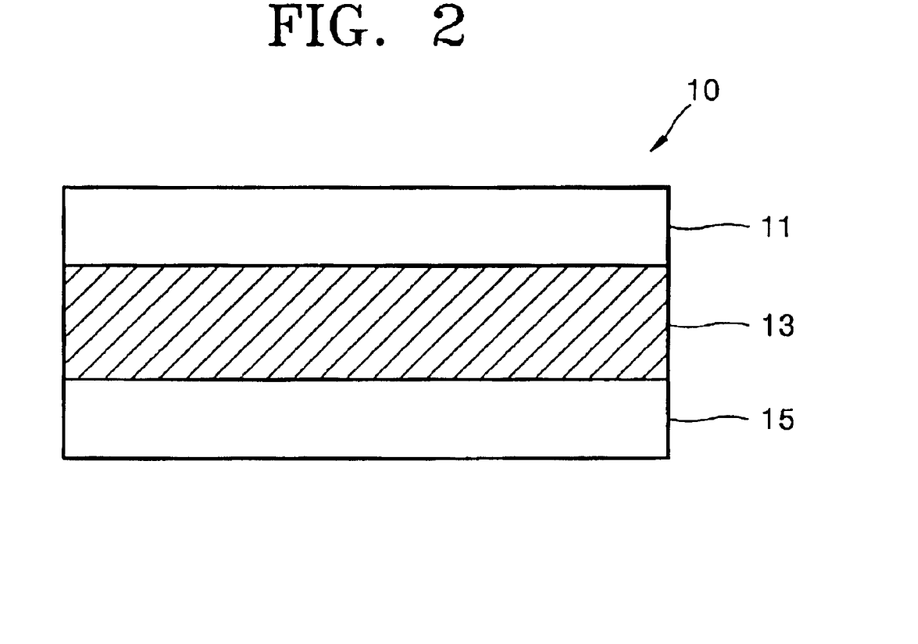
FIG. 2 is a cross-sectional view of a recording medium according to an embodiment of the present invention.

FIG. 2 is a cross-sectional view of a recording medium of an information storage apparatus according to an embodiment of the present invention. Referring to FIG. 2, a recording medium 10 according to an embodiment of the present invention includes an electrode layer 15, a ferroelectric film 13 that is stacked on the electrode layer 15, and a semiconductor layer 11 that is stacked on the ferroelectric film 13.

The ferroelectric film 13 is a medium having ferroelectricity as a ferroelectric thin film, a thick film or a bulk. A ferroelecric substance includes Pb(Zr, Ti)O$_3$, Rochelle salt, barium titanate, and the like, which has a spontaneous polarization therein. In the information storage apparatus according to the present invention, it is preferable that a dielectric polarization remaining in the ferroelectric film 13 has a size of 10 $\mu$C/cm$^2$ to easily record and reproduce information.

Figure 3:
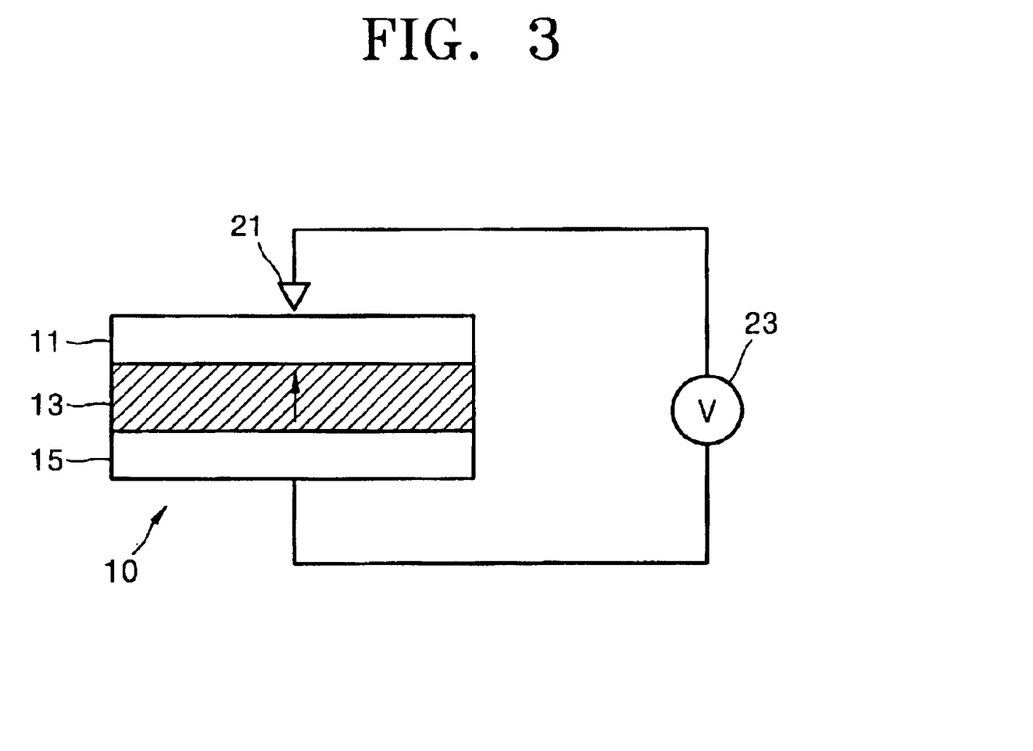
FIG. 3 is a view explaining a method of recording information using an information storage apparatus according to the embodiment of the present invention.

FIG. 3 is a schematic view of an information storage apparatus according to the embodiment of the present invention, which in particular, shows a power source required when information is recorded on a recording medium and the arrangement of the information storage apparatus. Referring to FIG. 3, the information storage apparatus according to the embodiment of the present invention includes a recording medium 10, a semiconductor probe 21, and a power source 23. Here, the semiconductor probe 21 contacts or does not contact the recording medium 10 to record information. The power source 23 applies a voltage between the semiconductor probe 21 and an electrode layer 15.

The semiconductor probe 21 is formed of an n-type semiconductor if a semiconductor layer 11 of the recording medium 10 is a p-type semiconductor. The semiconductor probe 21 is formed of a p-type semiconductor if the semiconductor layer 11 of the recording medium 10 is an n-type semiconductor. The semiconductor probe 21 is conic, pyramidic, or cylindrical, whose radius is 50 nm or less.

A cantilever (not shown) is preferably further included to support the semiconductor probe 21. The semiconductor probe 21 and the cantilever may be coated with a metal conductive film to improve conductivity and prevent an oxide film.

The information storage apparatus according to the present invention applies a voltage to the semiconductor probe 21 and forms dielectric polarizations having a predetermined size in a ferroelecric film 13 underneath the semiconductor probe 21 to record information on the recording medium 10. In this case, the semiconductor probe 21 contacts or does not contact the semiconductor layer 11. The dielectric polarizations are formed to be perpendicular to the surface of the ferroelectric film 13 due to an electric field between the semiconductor probe 21 and the electric layer 15. In other words, polarizations having two directions, i.e., up (↑) and down (↓) directions, are formed based on the polarity of the voltage. Information "0" and "1" may be applied to the directions of the polarizations, respectively, to record information.

Figure 4:
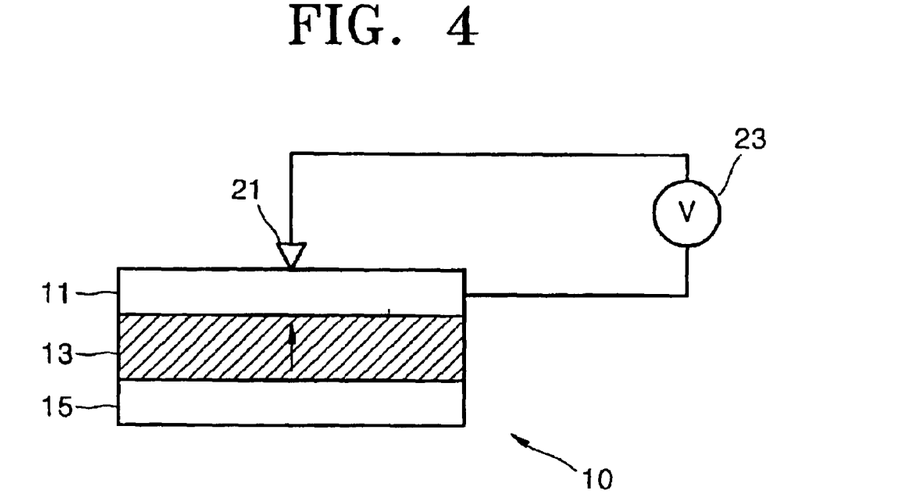
FIG. 4 is a view explaining a method of reproducing information using an information storage apparatus according to the embodiment of the present invention.

FIG. 4 is a schematic view of an information storage apparatus according to the embodiment of the present invention, which in particular, shows a power source required when information recorded on a recording medium is reproduced and the arrangement of the information storage apparatus. Referring to FIG. 4, if information is reproduced using the information apparatus according to the embodiment of the present invention, a semiconductor probe 21 contacts a semiconductor layer 11 to form a p-n junction. Next, a voltage is applied between the semiconductor probe 21 and the semiconductor layer 11 to measure resistance between the semiconductor probe 21 and the semiconductor layer 11. As a result, directions of dielectric polarizations in an area in which the semiconductor probe 21 is positioned can be found out.

Forward bias is formed when a positive voltage is applied to a semiconductor probe and a negative voltage is applied to a semiconductor layer if the semiconductor probe is a p-type semiconductor and the semiconductor layer is an n-type semiconductor. Here, as shown in FIG. 4, current does not flow well and information is "0" if a dielectric polarization is formed in an up direction. Current flows well and information is "1" if a polarization is formed in a down direction.

If the semiconductor probe is an n-type semiconductor and the semiconductor layer is a p-type semiconductor, a negative voltage is applied to the semiconductor probe and a positive voltage is applied to the semiconductor layer. In this case, in contrast to the above structure, current flows well and information is "1" if a polarization is formed in an up direction and current does not flow well and information is "0" if a polarization is formed in a down direction.

Figure 5:
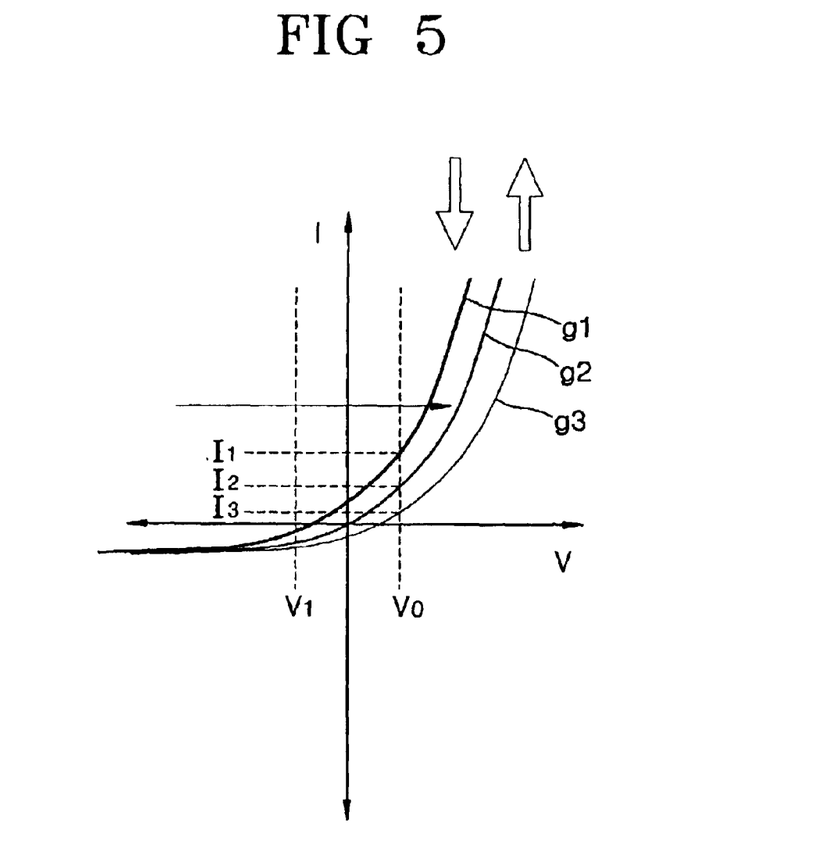
FIG. 5 is a graph of I-V characteristics of a p-n junction structure.

FIG. 5 is a graph of I-V characteristics of a p-n junction based on directions of dielectric polarizations. Referring to FIG. 5, g1 represents an I-V characteristic if the direction of a polarization is down, g2 represents a reference curve, and g3 represents an I-V characteristic if the direction of a polarization is up. If a voltage of the p-n junction is $V_0$, current is $I_1$ when the direction of the polarization is down, current is $I_2$ in the reference curve, and current $I_3$ when the direction of the polarization is up.

Resistance R with respect to each polarization direction can be obtained from Ohm's law (V=I×R). The resistance value $$R_2 = \frac{V}{I_2}$$

of the reference curve is the standard value. A resistance value can be obtained from a current value which is scanned and detected by the semiconductor probe 21 on the recording medium 10 using a predetermined voltage of the p-n junction and the relation equation to distinguish a polarization direction in each domain. In other words, resistance $R_1$ is $V_0/I_1$ if current is $I_1$ on g1 and resistance R3 is $V_0/I_3$ if current is $I_3$ on g3. The resistance R1 is smaller than the resistance R2 and greater than the resistance R3 and information "0" and "1" may be applied to each resistance value to detect information.

Here, if a voltage V1 is applied to the p-n junction, there is little difference in current due to each polarization direction and thus it is difficult to distinguish directions of polarizations. If a voltage $V_2$ that is greater than $V_0$ is applied to the p-n junction, the difference in current due to each polarization direction increases but the circuit suffers from a large amount of energy loss due to heat. Thus, it is important to detect an appropriate voltage of the p-n junction.

Figure 6:
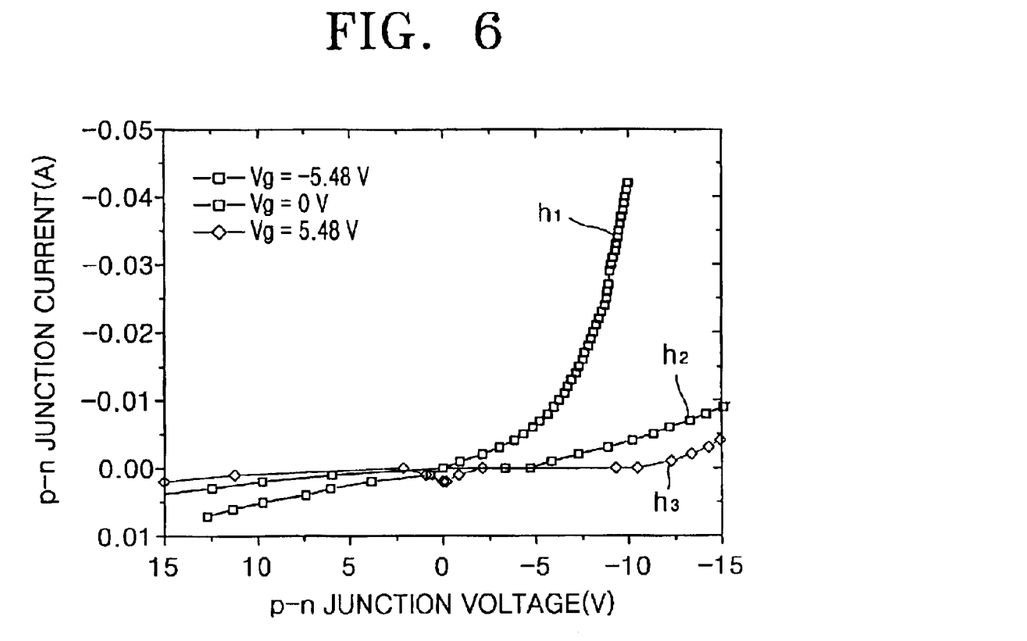
FIG. 6 is a graph of I-V characteristics of a p-Si/metal/n-Si.

FIG. 6 is a graph of current of a p-n junction based on variations in a voltage of the p-n junction with a voltage of each power source in a stack of a p-type semiconductor, a metal, and a n-type semiconductor which is similar to the p-n junction between the semiconductor probe 21 and the semiconductor layer 11 in the information storage apparatus according to the embodiment of the present invention.

A conventional p-n junction has a distinct p-n junction characteristic in that kind and ratio of impurities in a semiconductor are chemically controlled to manufacture a semiconductor having both p-type and n-type crystal regions. However, a p-n junction, which is formed by contacting the semiconductor probe 21 with the semiconductor layer 11 of the information storage apparatus according to the embodiment of the present invention, is a p-n junction due to a physical contact. Thus, a test for proving that the latter p-n junction characteristic is similar to the former p-n junction characteristic is required.

FIG. 6 is a graph showing variations in current of a p-n junction based on variations in a voltage of the p-n junction in a physical p-type semiconductor/metal/n-type semiconductor structure when power voltages are −5.48V, 0V, and 5.48V, respectively. Referring to FIG. 6, $h_1$, $h_2$, and $h_3$ represent current of the p-n junction based on variations in the voltage of the p-n junction when power voltages Vg are −5.48V, 0V, and 5.48V, respectively. From this I-V characteristic, it can be seen that current of the p-n junction greatly varies and thus resistance is easily controlled if the voltage Vg is −5.48V. From this graph, it can be seen that the characteristics of a physical p-n junction of a semiconductor probe and a semiconductor layer, according to the present invention, which are coated with metal, are similar to the characteristics of a chemical p-n junction.

Figure 7:
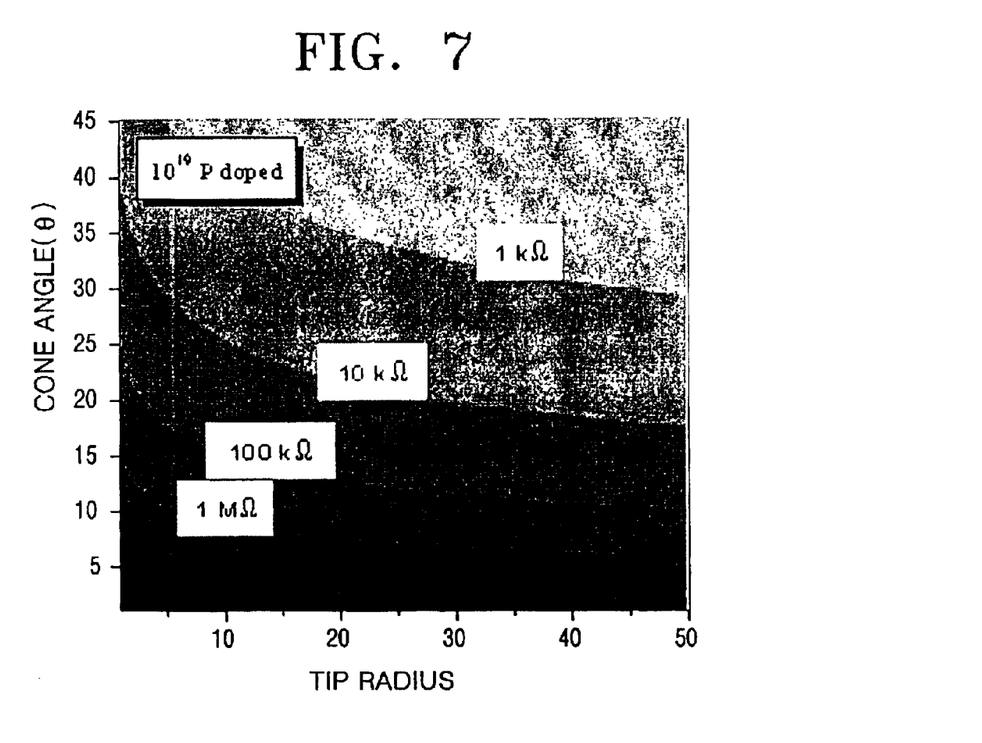
FIG. 7 is a graph of resistance values based on cone angle and radius of a $10^{19}$ doped p-type Si probe.

FIG. 7 is a graph showing resistance of the probe that varies based on the relationship between cone angle and radius of a $10^{19}$ doped p-type semiconductor probe. It is sent that resistance is about 10 kΩ if the radius of the probe is 20 nm and the cone angle is 20–25°. Resistance that can be sensed in an existing control circuit is generally 100 MΩ or less. However, it is preferable that resistance in the probe is 1 kΩ or less except for contact portions in order to sense variations in resistance in the p-n junction. Thus, cone angle is 35° or more if radius of a tip is 35 nm as in the graph shown in FIG. 7 to manufacture a probe having such resistance.

Figure 8:
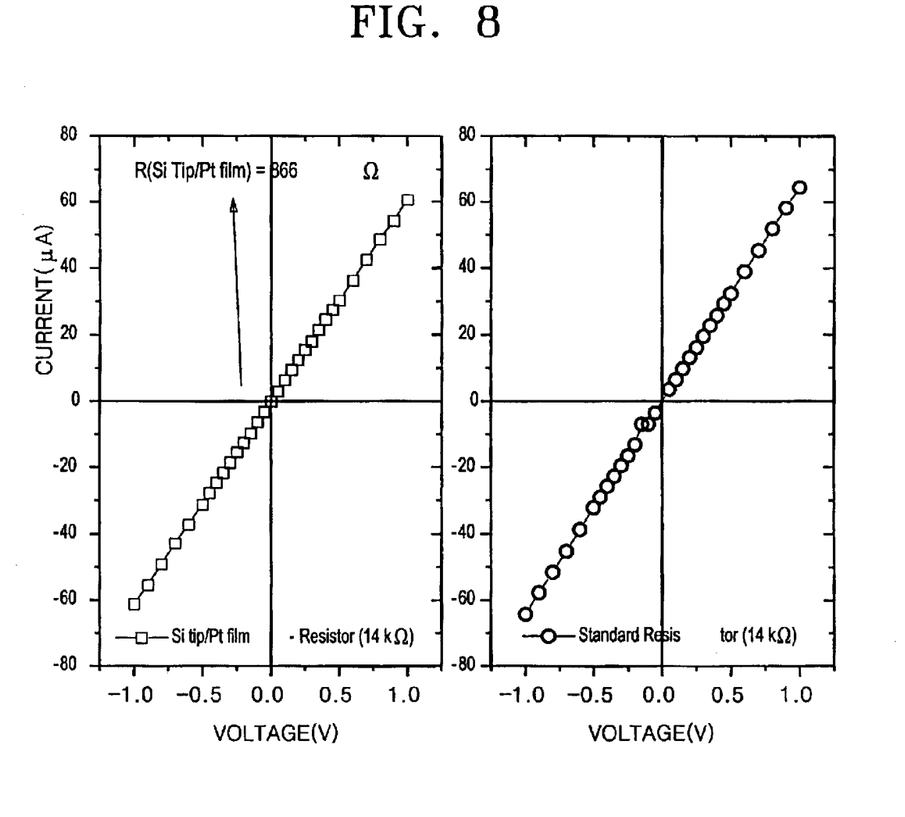
FIG. 8 is a graph of I-V characteristics of a $10^{19}$ doped p-type Si probe.

FIG. 8 is a graph showing I-V characteristics for obtaining resistance of a $10^{19}$ doped p-type semiconductor probe. As shown in FIG. 8, resistance R is 866 Ω from the I-V characteristics. A probe having resistance of about 1 kΩ is generally used.

Figure 9A:
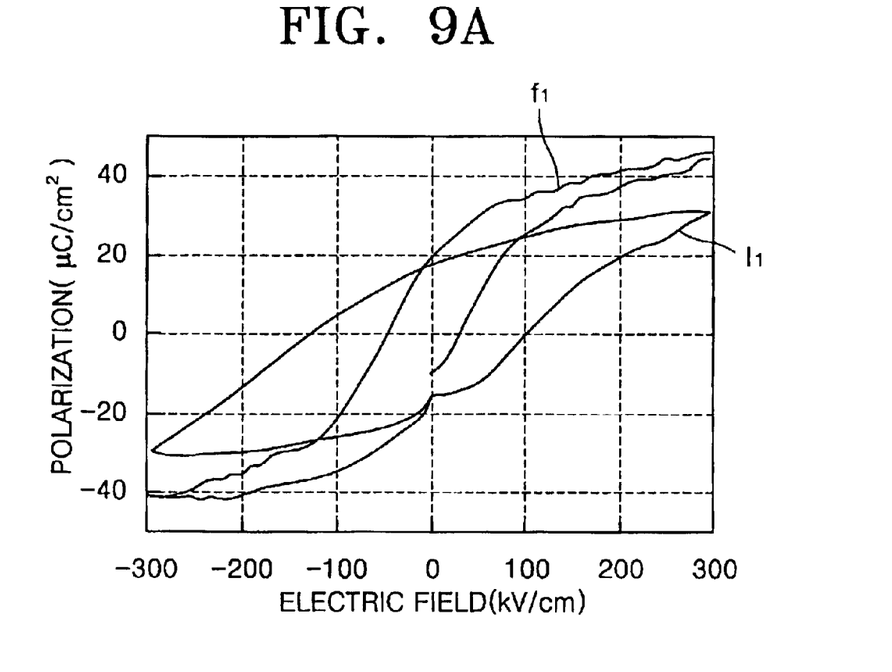
FIGS. 9A and 9B are graphs of P-E hysteresis curves of a p-Si/PZT/Pt and a n-Si/PZT/Pt.
Figure 9B:
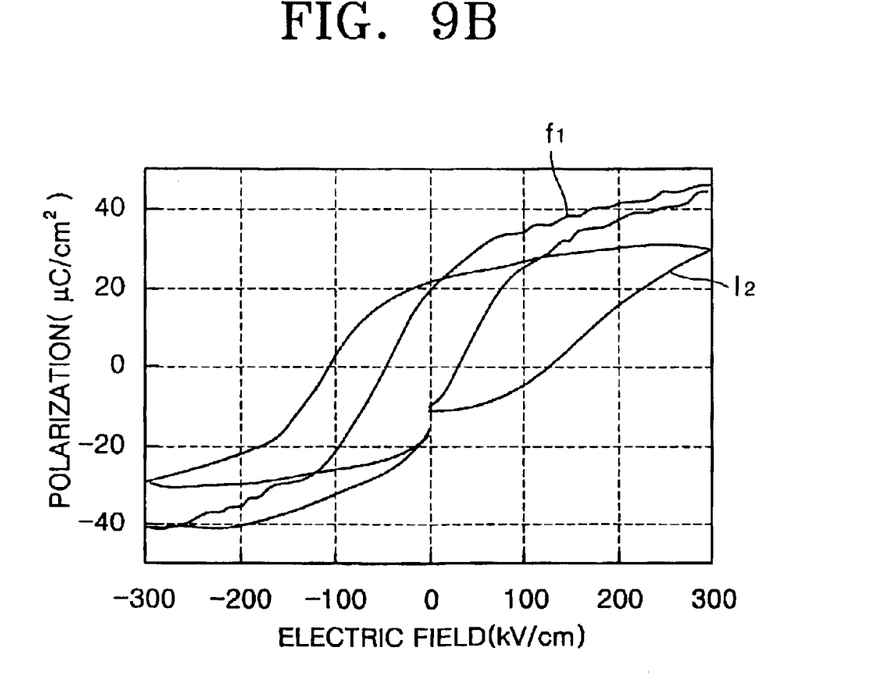

FIGS. 9A and 9B are P-E hysteresis curves showing variations in polarization based on an electric field in a recording medium of an information storage apparatus according to the embodiment of the present invention. In FIG. 9A, a PE characteristic graph $f_1$ of Pt/PZT/Pt is compared with a PE characteristic graph $I_1$ of Pt/n-Si/PZT/Pt. In FIG. 9B, a PE characteristic graph $f_1$ of Pt/PZT/Pt is compared with a PE characteristic graph $I_2$ of Pt/p-Si/PZT/Pt. Here, PZT is a ferroelectric substance having a chemical formula of $Pb(Zr_xTi_{1-x})O_3$.

The information storage apparatus according to the embodiment of the present invention can be used only when polarizations in two directions are clearly shown in an electric field based on variations of a polarization direction. As shown in FIGS. 9A and 9B, a polarization curve based on variations in an electric field in a structure in which a semiconductor layer is stacked on a ferroelectric film is similar to a hysteresis curve. Thus, polarizations in two directions are clearly shown in a specific electric field. In other words, it is possible to record and reproduce information based on variations in a dielectric polarization.

Figure 10:
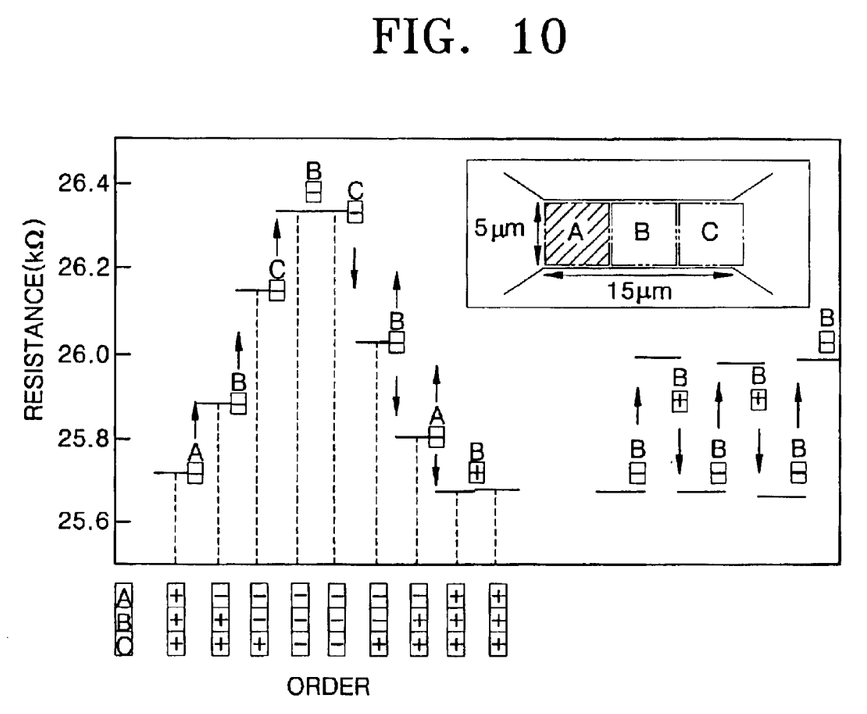
FIG. 10 is a graph of variations in a resistance value of a lower conductive layer according to a partial polarization reverse of a ferroelectric substance by an AFM tip.

FIG. 10 shows variations in resistance of a bottom conductive layer due to a partial polarization reverse of a ferroelectric body using an AFM tip. It is seen that resistance of the conductive layer under a ferroelectric film varies from 25.7 kΩ to about 26.3 kΩ based on the order of polarization directions in domains A, B, and C. Address information and specific information of a recording medium can be recorded using such variations in resistance.

An information storage apparatus according to an embodiment of the present invention includes a recording medium having a semiconductor layer and a probe made of a semiconductor material to form dielectric polarizations in a ferroelectric film. Thus, information can be highly integrated and then recorded and the recorded information can be reproduced at a high speed by measuring resistance values from a p-n junction. Further, since the probe has appropriate angle and radius, a lock-in amplifier is not necessary as in an existing control circuit. Thus, it is possible to small-size the information storage apparatus.

As described above, an information storage apparatus according to the present invention has advantages in that information can be highly integrated and repeatedly recorded using dielectric polarizations, information can be reproduced at a high speed using a p-n junction, and the information storage apparatus can be small-sized by the simplification of the entire structure thereof.

Many contents have particularly been described in the description, but must be interpreted as an example of a preferred embodiment not as restricting the scope of the present invention.

For example, those skilled in the art can manufacture an apparatus for recording reproducing information using various types of probes and a recording medium having various structures. Thus, the scope of the present invention must be defined by the appended claims not the described embodiment.

What is claimed is:

1. An information storage apparatus using a semiconductor probe, the information storage apparatus comprising:
   a recording medium having an electrode layer, a ferroelectric film that is stacked on the electrode layer, and a semiconductor layer that is stacked on the ferroelectric film; and
   a head having a semiconductor probe for forming a dielectric polarization on the ferroelectric film to record information and reproducing information from the dielectric polarizations on the ferroelectric film by making a p-n junction with the recording medium.

2. The information storage apparatus of claim 1, wherein the semiconductor probe is an n-type semiconductor if the semiconductor layer of the recording medium is a p-type semiconductor.

3. The information storage apparatus of claim 2, wherein the semiconductor probe records information in a state that the semiconductor probe does not contact the recording medium.

4. The information storage apparatus of claim 2, wherein the semiconductor probe records information in a state that the semiconductor probe contacts the recording medium.

5. The information storage apparatus of claim 2, wherein the semiconductor probe reproduces information in a state that the semiconductor probe contacts the recording medium.

6. The information storage apparatus of claim 1, wherein the semiconductor probe is a p-type semiconductor if the semiconductor layer of the recording medium is an n-type semiconductor.

7. The information storage apparatus of claim 6, wherein the semiconductor probe records information in a state that the semiconductor probe does not contact the recording medium.

8. The information storage apparatus of claim 6, wherein the semiconductor probe records information in a state that the semiconductor probe contacts the recording medium.

9. The information storage apparatus of claim 6, wherein the semiconductor probe reproduces information in a state that the semiconductor probe contacts the recording medium.

10. The information storage apparatus of claim 1, wherein the semiconductor probe records information in a state the semiconductor probe does not contact the recording medium.

11. The information storage apparatus of claim 1, wherein the semiconductor probe records information in a state that the semiconductor probe contacts the recording medium.

12. The information storage apparatus of claim 1, wherein the semiconductor probe reproduces information in a state that the semiconductor probe contacts the recording medium.

13. The information storage apparatus of claim 1, wherein the semiconductor probe has a radius of 50 nm or less.

14. The information storage apparatus of claim 1, wherein the semiconductor probe is one of a conic probe, a pyramidic probe, and a cylindrical probe.

15. The information storage apparatus of claim 1, wherein contact resistance between the semiconductor layer and the semiconductor probe varies based on polarity of the ferroelectric film.

16. The information storage apparatus of claim 1, wherein the head further comprises a cantilever for supporting the semiconductor probe.

17. The information storage apparatus of claim 1, wherein the ferroelectric film has a dielectric polarization of 10 $\mu C/cm^2$ or more.

* * * * *